Patented Sept. 14, 1937

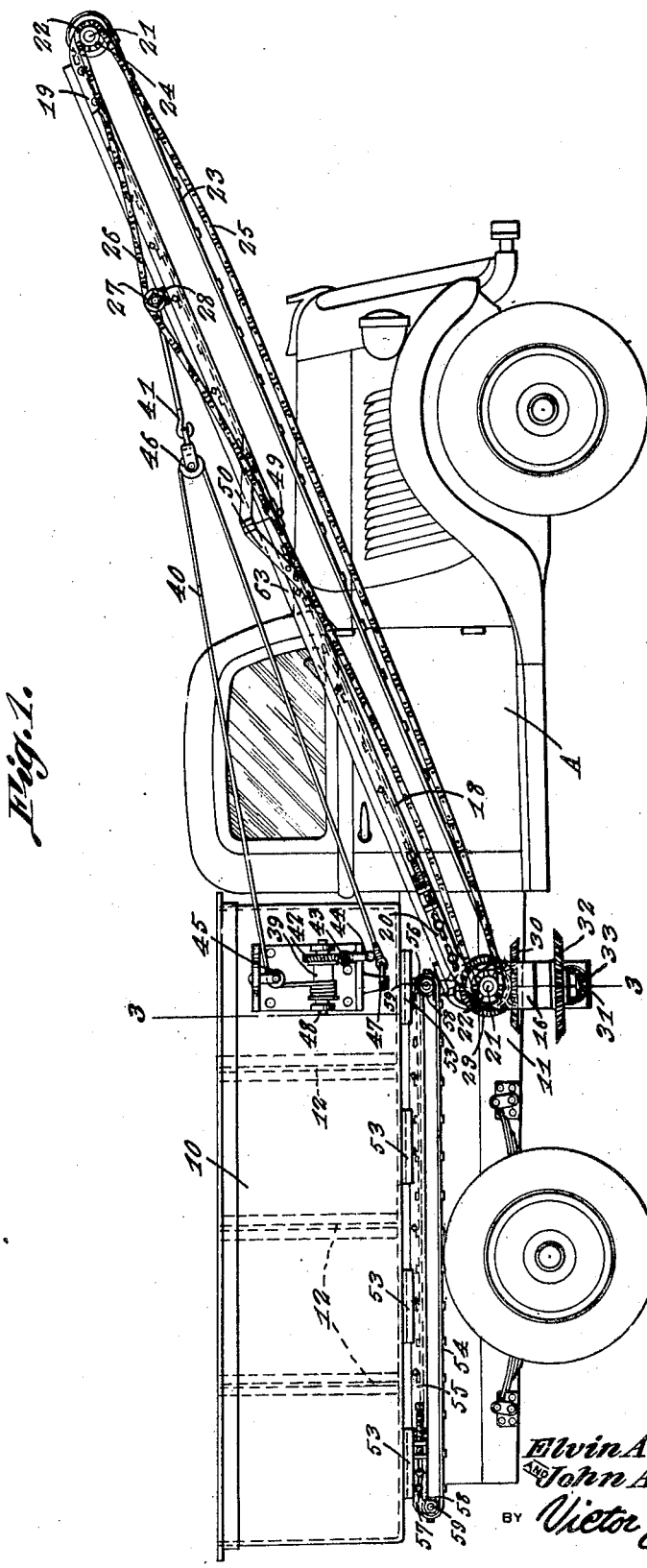

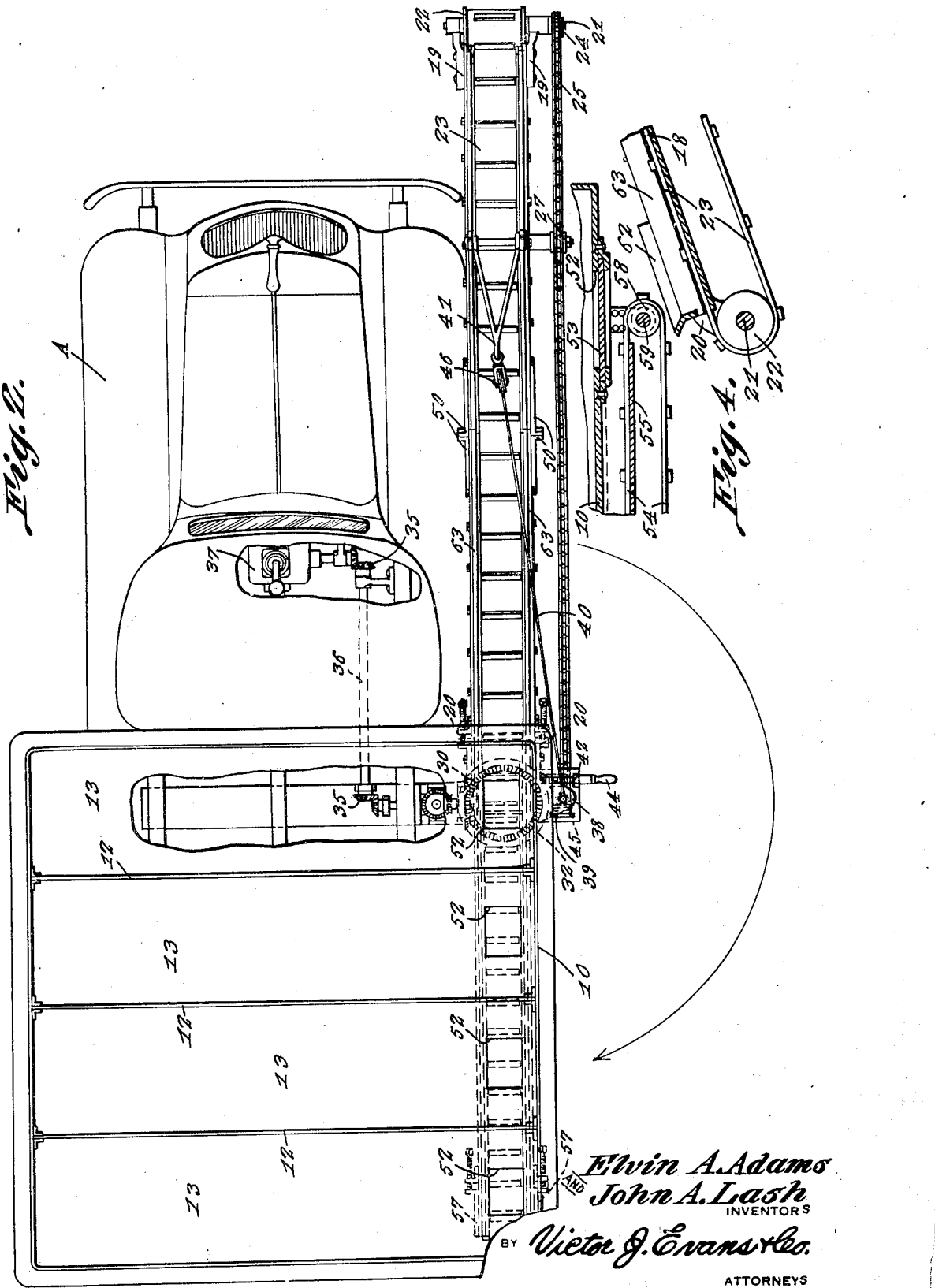

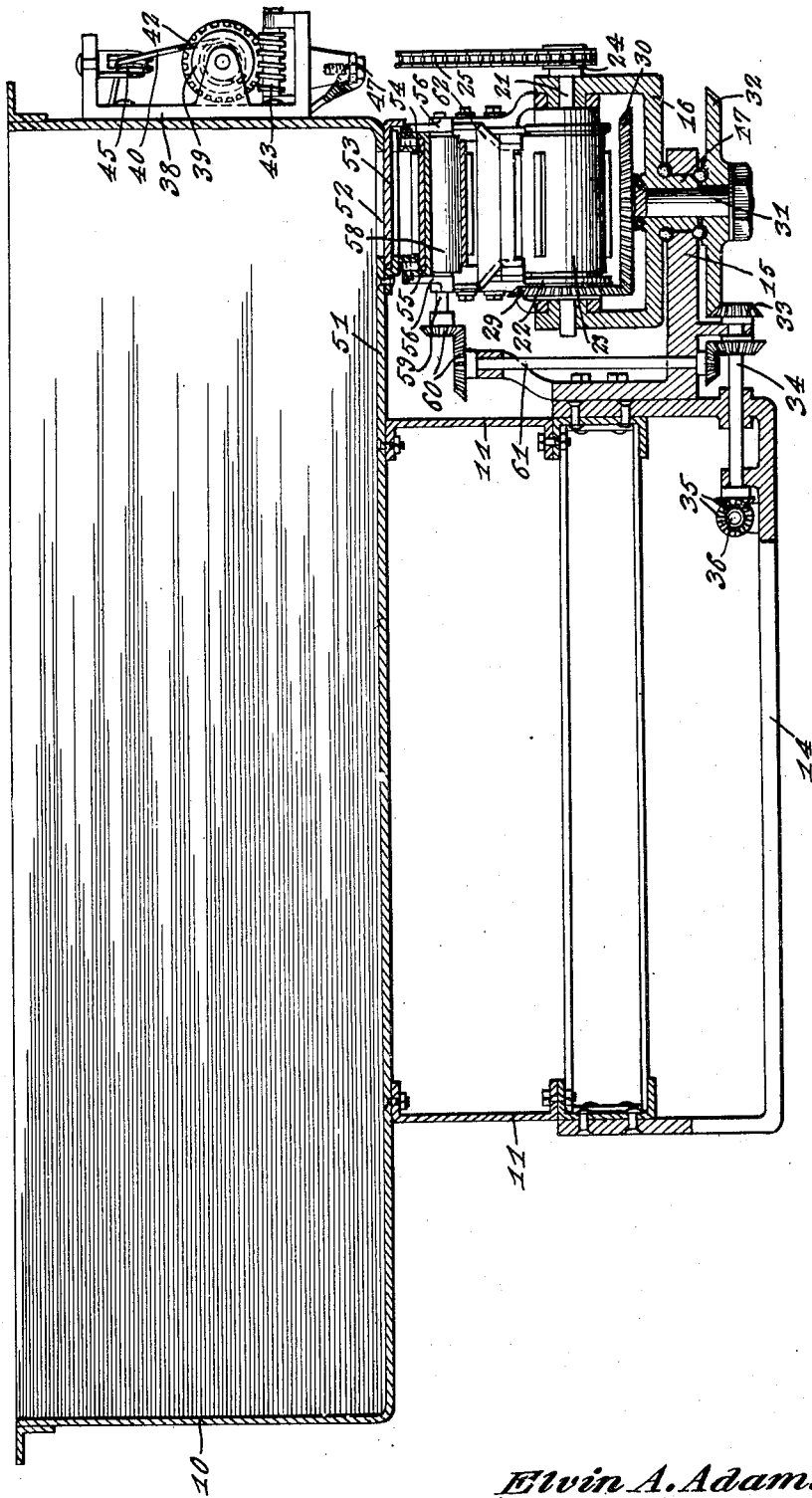

2,093,300

UNITED STATES PATENT OFFICE 2,093,300

MOBILE CONVEYER MECHANISM

Elvin A. Adams and John A. Lash, Temple, Pa.

Application July 21, 1936, Serial No. 91,771

4 Claims. (Cl. 214—83)

The invention relates to a mobile conveyer mechanism and more especially to a conveyer for unloading and delivering loose material from vehicles.

The primary object of the invention is the provision of a conveyer of this character, wherein the same is attached to and driven by a motor truck for unloading coal, stone and similar loose materials without lifting the whole load and truck body, the conveyer being capable of operation through an arc of one hundred and eighty degrees on a vertical axis and is raised and lowered to the required height when making delivery therefrom.

Another object of the invention is the provision of a conveyer of this character, wherein the same when in normal position will not protrude laterally beyond the truck body but will be confined within the regulation width of such body and in this manner avoiding damage to the conveyer through side swiping with other vehicles or objects.

A further object of the invention is the provision of a conveyer of this character, wherein the mounting thereof is such that it will unload and deliver materials from selected areas of the truck body, especially where the body is divided into independent compartments through the use of partitions thus enabling a determined amount of material to be unloaded and delivered without disturbing the remainder of the load or the material carried within the body of the truck.

A still further object of the invention is the provision of a conveyer of this character, wherein the adjustment, either by swinging or vertically raising or lowering such conveyer, may be had with dispatch and such adjustment will enable the said conveyer to be swung to any position and height and yet dispose the receiving end directly below the discharge end of a feed belt carrying the coal or other material as emptied from the truck.

A still further object of the invention is the provision of a conveyer of this character, which is comparatively simple in its construction, thoroughly reliable and efficient in its operation, readily and easily adjusted, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention, and pointed out in the claims hereunto appended.

In the accompanying drawings:

Figure 1 is a side elevation of a truck showing the conveyer constructed in accordance with the invention applied thereto.

Figure 2 is a top plan view, the truck including its hood being partly broken away.

Figure 3 is a vertical transverse sectional view on the line 3—3 of Figure 1.

Figure 4 is a fragmentary vertical longitudinal sectional view through the truck and the conveyer.

Similar reference characters indicate corresponding parts throughout the several views in the drawings.

Referring to the drawings in detail, A designates generally a motor truck having a box-like body 10 for the transportation of loose material and in this instance is fixed against dumping or tilting upon the chassis 11 of such truck although such body can be otherwise mounted in place. This body 10 is equipped with transverse partitions 12 dividing it into a plurality of compartments 13 interiorly thereof so that determined quantities of material of loose kind can be stored or held within said body for the unloading and delivering of said material in these determined quantities. The partitions 12 are removably fitted within the body 10 and when removed will give full capacity storage within said body for the material.

Secured transversely to the chassis 11 of the truck is a substantially U-shaped hanger 14 preferably of strap iron and carried at one end of the latter is an L-shaped bracket 15, its horizontal arm having journaled therein a turning yoke 16 swinging on a vertical axis constituted by a tubular stud 17 fitting the said bracket. The yoke 17 supports an unloading and delivering conveyer hereinafter fully described.

The unloading and delivering conveyer comprises an elongated frame 18 which at opposite ends is provided with stationary and adjustable bearings 19 and 20, respectively, the adjustable bearings being interfitted with the yoke 16 so that the frame 18 can be swung vertically to have the outer end of the conveyer extend to a desired height. These bearings have passed therethrough axles 21 carrying rollers 22 over which is trained the endless conveyer belt or apron 23, the rollers being fixed to the axles 21 and such belt or apron 23 is coextensive with the length of the frame 18 and slightly protrudes beyond opposite ends thereof. The axles 21 at the outer side of the conveyer have fixed thereto sprocket gears 24 over which is trained an endless sprocket chain 25, which at its upper stretch 26 is trained over an idle sprocket gear 27 mounted at 28 on the frame 18 to eliminate sagging of such chain and by the latter the rollers 22 are positively driven at opposite ends of the frame 18.

On the roller axle 21 within the yoke 16 is fixed a gear 29 meshing with a companion gear 30 fixed to a stud shaft 31 journaled in the stud 17 of the yoke 16. This stud shaft 31 also has fixed thereto a gear 32 meshing with a pinion 33 fixed to a driven shaft 34 which through gear and shaft connections 35 and 36, respectively, with the truck motor enables the motor driving of the conveyer. The connections 35 and 36 are in association with the transmission control 37 of the truck.

The bracket 15 is of a kind to locate the yoke 16 with the conveyer frame 18 swingingly fitted therewith beneath the body 10 at one side of the chassis 11 of the truck. Mounted on the body 10 at that side where the conveyer is located is a bracket 38 in which is journaled a windlass 39 on which is to be wound and unwound a hoisting cable 40 operatively connected at 41 with the conveyer frame 18 so that the latter may be raised or lowered and the raising thereof had at any desired height. The windlass 39 has fixed thereto a worm gear 42 with which meshes a worm screw 43 operated from a hand crank 44 so that the conveyer frame 18 will be manually controlled for raising and lowering of the same. The cable 40 is trained over guide pulleys 45 and 46, respectively, and one end of this cable is fixed at 47 to the bracket 38 while the other end is adapted for winding on and unwinding from the windlass 39. The pulley 45 and the attaching end 47 of the cable 40 are free for rotation so as not to interfere with the horizontal swinging of the said conveyer through an arc of one hundred and eighty degrees on the vertical axis constituted by the stud 32 of the yoke 16 and in this manner unloading and delivering material from the truck may be had fore and aft and throughout one side of the latter. The windlass has cooperating therewith a suitable latching device 48 for holding the windlass stationary when the cable 40 is wound thereon and thus sustaining the conveyer in its elevated adjusted position yet such conveyer can be lowered at will on releasing the device 48.

The frame 18 of the conveyer is preferably made in two sections connected by a hinge 49 to permit the folding of the frame by the swinging of the outermost section downwardly and inwardly against the inner section thereof. These sections when unfolded carry abutments 50 at the hinge point thereof so as to maintain alignment in the unfolded condition of said conveyer and rigidly in this condition, there being no possibility of accidental folding of said conveyer when operating for unloading and delivering material from the truck.

The body 10 of the truck A has formed in its bottom 51 discharge openings 52, these common to the compartments 13 created by the partitions 12 within said body and each opening 52 is closed by a slide gate 53, hand operated, while confronting the said openings 52 is a feed belt 54 within a frame 55 fixed to the under side of the bottom 51 of said body and disposed in a longitudinal direction thereof. This frame similarly to the frame 18 is equipped with stationary and adjustable bearings 56 and 57, respectively, and the end rollers 58 over which the endless belt 54 is trained, the adjustability of the bearings 20 and 57 being for the purpose of tightening of the belts 23 and 54, respectively. The axle 59 of the roller 58 at the end of the belt 54 next to the conveyor through driven gear and shaft connections 60 and 61, respectively, with the gear and shaft 33 and 34, respectively, will drive the belt 54. The conveyer frame 18 at the end next to the belt 54 has built thereon a receiving hopper 62 for accommodating material discharged from the said belt 54 for the acquiring of such material by the conveyer belt 23 which will unload and deliver its material from the outer end of the said conveyer at a selected point of deposit. The material within the body 10 is admitted onto the belt 54 when the gates 53 have been manually opened as the material will flow through the openings 52 in the bottom 51 of said body directly onto the said belt 54 whence such material will be carried thereby onto the conveyer for the unloading and delivering of such material thereby.

The frame 18 is equipped at its opposite sides with side guards or boards 63 to avoid the material falling from the conveyer at opposite sides thereof, this being common to endless conveyer constructions.

It will be clearly evident from the foregoing description taken in connection with the showing in the drawings that the contents of the body 10 of the truck A can be readily and conveniently unloaded and delivered throughout one side of the said truck at a selected point thereof or fore and aft of this truck and additionally the material during unloading and delivery can be raised to the required height without lifting the whole load and truck body.

What is claimed is:

1. In a truck having a body provided with a flat bottom with openings spaced from each other and close to one side each of said body, transversely arranged partitions removably fitted in the body between said openings for effecting a plurality of compartments therein, slide gates fitted with the bottom of said body and closing the openings in said bottom, an endless feeder belt movably supported longitudinally of the body immediately beneath the openings in its bottom, and an extensible conveyer having its end next to said feeder belt pivotally supported beneath the latter for slight overlap of said feeder belt with respect to said conveyer and vertical and horizontal swing of said conveyer.

2. In a truck having a body provided with a flat bottom with openings spaced from each other and close to one side each of said body, transversely arranged partitions removably fitted in the body between said openings for effecting a plurality of compartments therein, slide gates fitted with the bottom of said body and closing the openings in said bottom, an endless feeder belt movably supported longitudinally of the body immediately beneath the openings in its bottom, an extensible conveyer having its end next to said feeder belt pivotally supported beneath the latter for slight overlap of said feeder belt with respect to said conveyer and vertical and horizontal swing of said conveyer, and means exteriorly of the body and having connection with the conveyer for effecting vertical swing thereof and accessible without the body at one side thereof.

3. In a truck having a body provided with a flat bottom with openings spaced from each other and close to one side each of said body, transversely arranged partitions removably fitted in the body between said openings for effecting a plurality of compartments therein, slide gates fitted with the bottom of said body and closing the openings in said bottom, an endless feeder belt movably supported longitudinally of the body immediately beneath the openings in its bottom, an extensible conveyer having its end next to said feeder belt pivotally supported beneath the latter for slight overlap of said feeder belt with respect to said conveyer and vertical and horizontal swing of said conveyer, means exteriorly of the body and having connection with the conveyer for effecting vertical swing thereof and accessible without the body at one side thereof, and a motor within the truck and having driving connection with the feeder belt and conveyer for operating the same in unison with each other.

4. In a truck having a body provided with a flat bottom with openings spaced from each other and close to one side each of said body, transversely arranged partitions removably fitted in the body between said openings for effecting a plurality of compartments therein, slide gates fitted with the bottom of said body and closing the openings in said bottom, an endless feeder belt movably supported longitudinally of the body immediately beneath the openings in its bottom, an extensible conveyer having its end next to said feeder belt pivotally supported beneath the latter for slight overlap of said feeder belt with respect to said conveyer and vertical and horizontal swing of said conveyer, means exteriorly of the body and having connection with the conveyer for effecting vertical swing thereof and accessible without the body at one side thereof, a motor within the truck and having driving connection with the feeder belt and conveyer for operating the same in unison with each other, and a bracket swingingly supporting the conveyer and connected with the truck at one side thereof.

ELVIN A. ADAMS.
JOHN A. LASH.